(12) United States Patent
Marinsek

(10) Patent No.: US 11,852,539 B1
(45) Date of Patent: Dec. 26, 2023

(54) CRYOGENIC CAMERA ASSEMBLY WITH NON-CRYOGENIC ELECTRICAL CONNECTION SUBPLATFORM

(71) Applicant: Raytheon Company, Waltham, MA (US)

(72) Inventor: Stephen Marinsek, Albuquerque, NM (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/812,751

(22) Filed: Jul. 15, 2022

(51) Int. Cl.
*G01J 5/061* (2022.01)
*G01J 5/04* (2006.01)
*F25D 19/00* (2006.01)
*G01J 5/06* (2022.01)

(52) U.S. Cl.
CPC ............ *G01J 5/061* (2013.01); *F25D 19/006* (2013.01); *G01J 5/045* (2013.01); *G01J 2005/065* (2013.01)

(58) Field of Classification Search
CPC ...... G01J 5/061; G01J 5/045; G01J 2005/065; F25D 19/006
See application file for complete search history.

(56) References Cited

U.S. PATENT DOCUMENTS

| | | | | |
|---|---|---|---|---|
| 4,055,765 A * | 10/1977 | Gerber | .................. | G01T 1/2928 250/363.02 |
| 5,091,646 A * | 2/1992 | Taylor | ..................... | H04N 3/09 348/E3.01 |
| 5,274,235 A * | 12/1993 | Taylor | ..................... | G01J 5/061 348/E3.01 |
| 5,506,200 A * | 4/1996 | Hirschkoff | ............. | A61B 5/245 505/162 |
| 6,802,918 B1 * | 10/2004 | Hughes | .................. | H05K 3/323 156/298 |
| 7,239,499 B2 | 7/2007 | Hsieh et al. | | |
| 7,278,278 B2 | 10/2007 | Wowk et al. | | |
| 11,002,607 B2 * | 5/2021 | Marinsek | .............. | G01J 5/0806 |
| 11,614,365 B1 * | 3/2023 | Reeves | ..................... | G01J 5/06 250/352 |

(Continued)

*Primary Examiner* — David P Porta
*Assistant Examiner* — Gisselle M Gutierrez
(74) *Attorney, Agent, or Firm* — Renner, Otto, Boisselle, & Sklar

(57) ABSTRACT

A camera assembly includes a housing inside of which components are maintained at a cryogenic temperature. The components maintained at cryogenic temperature include a detector that is mounted on an integrated circuit, which in turn is mounted on a platform, such as a ceramic platform, which includes electrical connections for the integrated circuit. The camera assembly also includes one or more subplatforms, maintained above the cryogenic temperature, such as ambient temperature, that receive electrical inputs from outside the housing, and make electrical connections to the platform. The connections may be made from the one or more subplatforms, through openings in the platform and/or outside one or more outer edges of the platform. The assembly may include covers of exposed parts of the one or more subplatforms, to facilitate thermal isolation between the interior of the assembly (at cryogenic temperature) and the one or more subplatforms (above cryogenic temperature).

20 Claims, 3 Drawing Sheets

(56) References Cited

U.S. PATENT DOCUMENTS

| | | | |
|---|---|---|---|
| 2013/0181086 A1* | 7/2013 | Bielas | G01C 25/005 |
| | | | 701/1 |
| 2020/0309601 A1* | 10/2020 | Marinsek | H04N 23/54 |
| 2022/0116525 A1* | 4/2022 | Sprafke | H04N 23/52 |
| 2022/0321806 A1* | 10/2022 | Marinsek | G01J 5/04 |

* cited by examiner

CRYOGENIC CAMERA ASSEMBLY WITH NON-CRYOGENIC ELECTRICAL CONNECTION SUBPLATFORM

FIELD

The disclosure is in the field of camera assemblies with cryogenic detectors, such as infrared detectors.

BACKGROUND

Infrared cameras with cooled detectors (photovoltaic) must be at cryogenic temperatures prior to operation. A finite amount of time is required to cool the cryogenic portion of the camera to operating temperatures. This time is proportional to thermal mass and heat load. Customers sometimes specify cooldown time as a requirement.

New digital ROICs (readout integrated circuits) require significantly thicker ceramic platforms and much more on-board bypass capacitance, adding thermal mass. Furthermore, non-cryogenic capacitors lose ~66% of their capacitance when at cryogenic temperatures.

SUMMARY

A camera assembly includes a detector that operates at cryogenic temperatures, and is on a cryogenic platform, and one or more subplatforms at a non-cryogenic temperature that contain electrical components.

According to an aspect of the disclosure, a camera assembly includes: a housing; a platform inside the housing, wherein the platform is maintained at a cryogenic temperature; a detector mounted on the platform and maintained at the cryogenic temperature; and one or more subplatforms inside the housing, that provide electrical connections to the platform; wherein the one or more subplatforms are at a non-cryogenic temperature.

According to an embodiment of any paragraph(s) of this summary, the one or more subplatforms are above the cryogenic temperature.

According to an embodiment of any paragraph(s) of this summary, at least some of the electrical connections between the platform and the one of the more subplatforms includes electrical connections that pass through one or more openings in the platform.

According to an embodiment of any paragraph(s) of this summary, the one or more openings include one or more rectangular openings.

According to an embodiment of any paragraph(s) of this summary, the one or more openings include openings on opposite sides of the detector.

According to an embodiment of any paragraph(s) of this summary, the camera assembly further includes one or more covers that cover respective of the one or more openings.

According to an embodiment of any paragraph(s) of this summary, the one or more covers reflect radiation from the one or more openings away from a cryogenic interior volume that is within the housing.

According to an embodiment of any paragraph(s) of this summary, at least some of the electrical connections between the platform and one of the more subplatforms includes electrical connections that pass around one or more outer edges of the platform.

According to an embodiment of any paragraph(s) of this summary, the one or more subplatforms are in direct contact with the housing.

According to an embodiment of any paragraph(s) of this summary, the one or more subplatforms are maintained at an ambient temperature of an environment outside the housing.

According to an embodiment of any paragraph(s) of this summary, electrical components are located on the one or more subplatforms.

According to an embodiment of any paragraph(s) of this summary, the electrical components include capacitors.

According to an embodiment of any paragraph(s) of this summary, the capacitors are wire bonded to the platform.

According to an embodiment of any paragraph(s) of this summary, the capacitors are wire bonded to the one or more subplatforms.

According to an embodiment of any paragraph(s) of this summary, the capacitors are soldered to the one or more subplatforms.

According to an embodiment of any paragraph(s) of this summary, the electrical components are aligned with one or more openings in the platform.

According to an embodiment of any paragraph(s) of this summary, the electrical components are outside a footprint of a cold shield that is attached to the platform.

According to an embodiment of any paragraph(s) of this summary, the detector is mounted to an integrated circuit, and the integrated circuit is in turn mounted on the platform.

According to an embodiment of any paragraph(s) of this summary, the detector is a photovoltaic detector of infrared light.

According to an embodiment of any paragraph(s) of this summary, the integrated circuit is a readout integrated circuit (ROIC).

According to an embodiment of any paragraph(s) of this summary, the ROIC is a digital readout integrated circuit (DROIC).

According to an embodiment of any paragraph(s) of this summary, the ROIC is a digital pixel readout integrated circuit (DPROIC).

According to an embodiment of any paragraph(s) of this summary, the housing supports a window that allows incoming light into the housing, to the detector.

According to an embodiment of any paragraph(s) of this summary, wherein the camera assembly further includes a cold finger that is in contact with the platform.

According to an embodiment of any paragraph(s) of this summary, the cold finger passes through an opening in a subplatform of the one or more subplatforms.

According to an embodiment of any paragraph(s) of this summary, wherein the camera assembly further includes a cold shield within the housing.

According to an embodiment of any paragraph(s) of this summary, the cold shield is a metal cold shield.

According to an embodiment of any paragraph(s) of this summary, the metal cold shield is gold plated.

According to an embodiment of any paragraph(s) of this summary, the cold shield reflects stray radiation to keep the stray radiation from heating a cryogenic volume within the housing and the cold shield.

According to an embodiment of any paragraph(s) of this summary, the cold shield is thermally coupled to the platform.

According to an embodiment of any paragraph(s) of this summary, the cold shield is wire bonded to the platform.

According to an embodiment of any paragraph(s) of this summary, wherein the camera assembly further includes an optic mounted on the cold shield.

According to an embodiment of any paragraph(s) of this summary, the optic is a filter.

According to an embodiment of any paragraph(s) of this summary, the optic is a powered optic.

According to an embodiment of any paragraph(s) of this summary, the optic is an unpowered optic.

According to an embodiment of any paragraph(s) of this summary, the camera assembly is part of a missile.

According to an embodiment of any paragraph(s) of this summary, the camera assembly is part of a missile warning system.

According to an embodiment of any paragraph(s) of this summary, the camera assembly is part of a missile defense system.

According to another aspect of the disclosure, a method of operating a camera assembly includes the steps of: providing a detector of the camera assembly, on a platform of the camera assembly, within a housing of the camera assembly; providing electrical components of the camera assembly on one or more subplatforms of the camera assembly; and cooling the platform to a cryogenic temperature while the one or more subplatforms are at a non-cryogenic temperature.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

DETAILED DESCRIPTION

Figure 1:
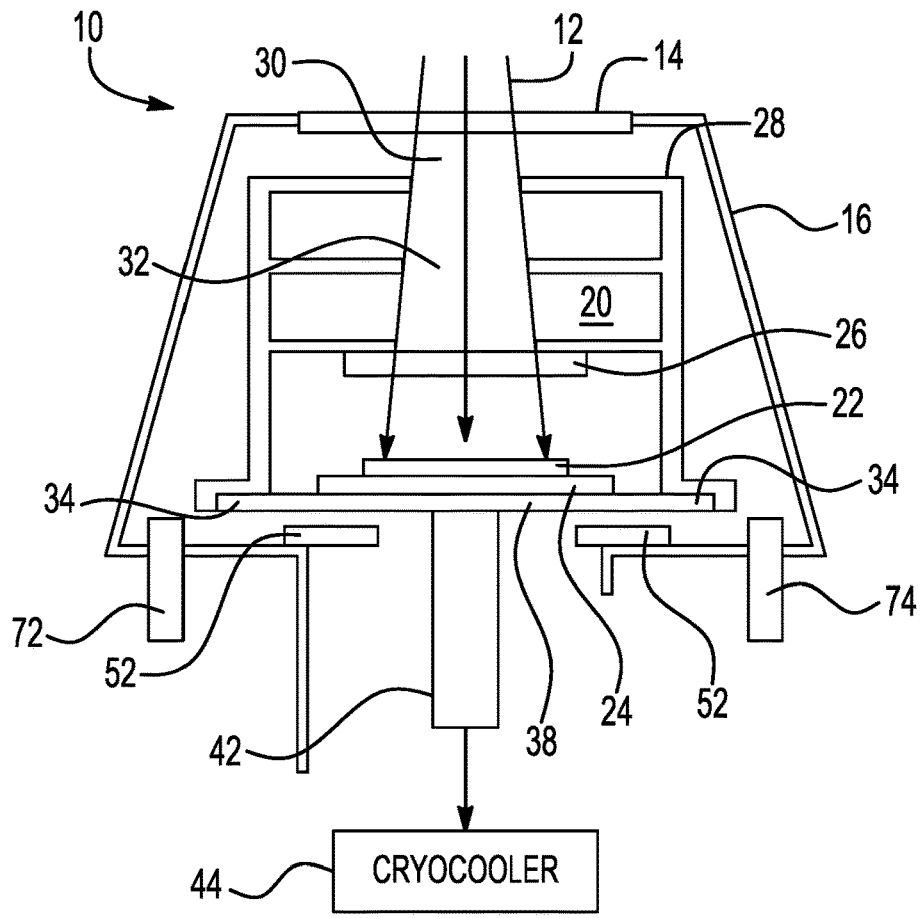
FIG. 1 is a side sectional view of a camera assembly in accordance with a disclosed embodiment.
Figure 2:
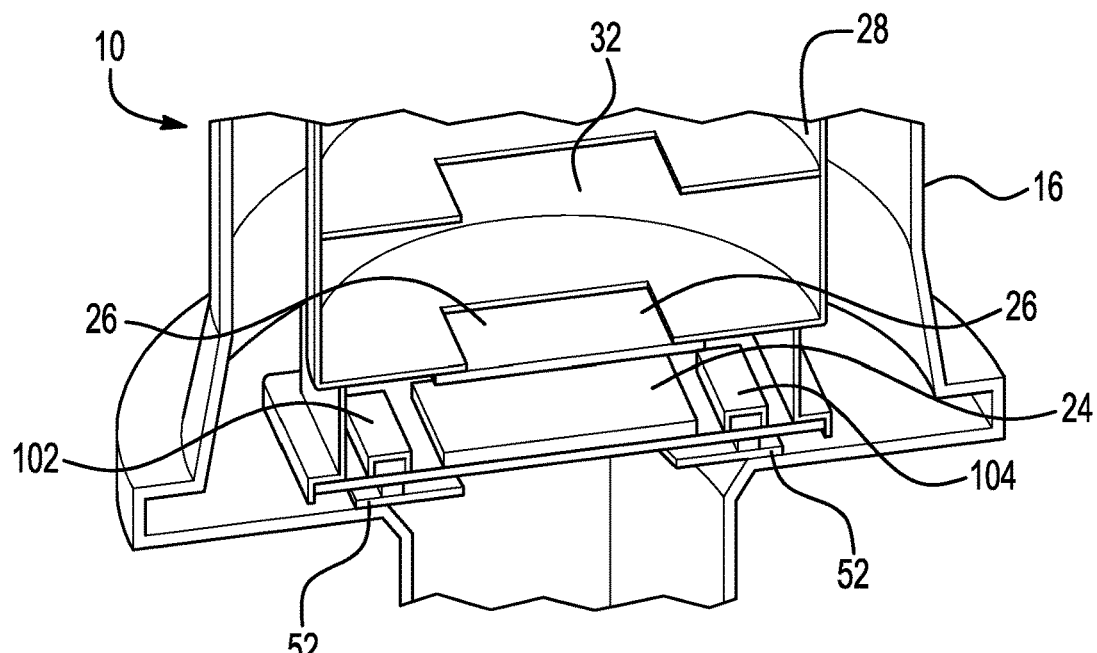
FIG. 2 is an oblique view of the camera assembly of FIG. 1, with the portions of the camera assembly removed for illustration purposes.

A camera assembly includes a housing inside of which components are maintained at a cryogenic temperature. The components maintained at cryogenic temperature include a detector that is mounted on an integrated circuit, which in turn is mounted on a platform, such as a ceramic platform, which includes electrical connections for the integrated circuit. The camera assembly also includes one or more subplatforms, maintained above the cryogenic temperature, such as ambient temperature, that receive electrical inputs from outside the housing, and make electrical connections to the platform. The connections may be made from the one or more subplatforms, through openings in the platform and/or outside one or more outer edges of the platform. The assembly may include covers of exposed parts of the one or more subplatforms, to facilitate thermal isolation between the interior of the assembly (inside the housing, at cryogenic temperature) and the one or more subplatforms (above cryogenic temperature). The use of the one or more subplatforms reduces the mass of the assembly that needs to be maintained at the cryogenic temperature.

FIGS. 1-4 show a camera assembly 10 for detection of incoming light 12, such as incoming infrared light. The light 12 comes in through a window 14 that is mounted in a housing 16 of the assembly 10. The housing 16, which may be considered a Dewar housing or container, maintains equipment within the housing 16, in an interior volume 20, with a vacuum and a cryogenic temperature in the inner volume 20. The housing 16 may be made of a suitable material for containing and maintaining the cryogenic and vacuum atmosphere in the inner volume 20.

An infrared (or other suitable light) detector (camera) 22 inside the housing 16 is used to receive the incoming light 12. The detector 22 may be a suitable photovoltaic detector, to give a nonlimiting example. The detector 22 is mounted on an integrated circuit (IC) 24, such as a readout integrated circuit (ROIC). The ROIC 24 is used to read signals from the detector 22, for example accumulating photocurrent from pixels or other elements of the detector 22, and providing a suitable output from the ROIC 24, for example to a computer or other suitable device (not shown) that is outside of the housing 16. The ROIC 24 may be any of a variety of suitable ROICs, such as digital readout integrated circuits (DROICs) that use on-chip analog-to-digital conversion (ADC) to digitize accumulated photocurrent for each pixel, or digital pixel readout integrated circuits (DPROICs) that apply ADS within each pixel or group of pixels.

An optic 26 is mounted in or on a cold shield 28, and is located between the window 14 and the detector 22, with the light 12 passing through the optic 26 on the way to the detector 22. The optic 26 may be a filter, and may be powered or unpowered.

The cold shield 28 functions to help maintain the detector 22 at the cryogenic temperature. The cold shield 28 blocks light from reaching the detector 22 on paths other than through the window 14, openings 30 and 32 of the cold shield 28, and the optic 26. Heat from this blocked light is conducted through the cold shield 28 to an outer part 34 of a platform 38 that is used to mount the ROIC 24 and the detector 22. The cold shield 28 may be made of a suitable metal, such as thin metal plated by gold, and may be adhesively-bonded or otherwise suitably coupled to the platform outer part 34, to facilitate transfer of heat from the cold shield 28 to the platform 38, to remove heat from the inner volume 20.

As noted above, the IC 24 is mounted on the platform 38. The IC 24 engages pads, contacts, traces, and/or vias in the platform 38 to transmit power and/or electrical signals.

The platform 38 may be made of a ceramic or another suitable material. The electrically-conductive portions of the platform 38 may be made of suitable metallic materials, such as copper, nickel, gold, tungsten, or a molybdenum-manganese alloy, to give a few non-limiting examples.

A cold finger 42 is operatively coupled to the platform 38 to maintain the platform 38 at the cryogenic temperature. Heat flows out through the cold finger 42 to a cryocooler 44. Heat flow from the cold shield 28 may pass into the platform 38 wire bonded coupling described above, and through the platform 38 through highly-heat-conductive material (such as suitable metals) on or in the platform 38, to the cold finger 42. Heat produced in the platform 38, and/or transferred from other components of the assembly 10 to the platform 38, is also transferred to the cold finger 42.

One or more subplatforms, such as a subplatform 52, may be used to place some of the electrical/electronic components that are located within the housing 16, and which would otherwise be located on the platform. Unlike the platform 38, the subplatform 52 is kept at a higher temperature, above the cryogenic temperature, for example at an ambient temperature that is outside of the housing 16 but in the vicinity of the housing 16. Alternatively the subplatform 52 may be at another temperature above the cryogenic temperature, such as a temperature between the cryogenic temperature and the ambient temperature.

To give non-limiting examples, the cryogenic temperature may be 60K to 120K. The ambient temperature may be any of a variety of higher temperatures, for example about 23° C., but varying based on environment, for example from hot desert to room temperature, to a cold-weather environment.

The subplatform 52 may be attached to a bottom surface of the housing 16, with the subplatform 52 in thermal communication with the housing 16. Thus the subplatform 52, at least as a first approximation, may be at the same or a similar temperature to that of the housing 16. The subplatform 52 has a central opening 54 that allows the cold finger 42 to pass therethrough to make contact with the platform 38.

Figure 3:
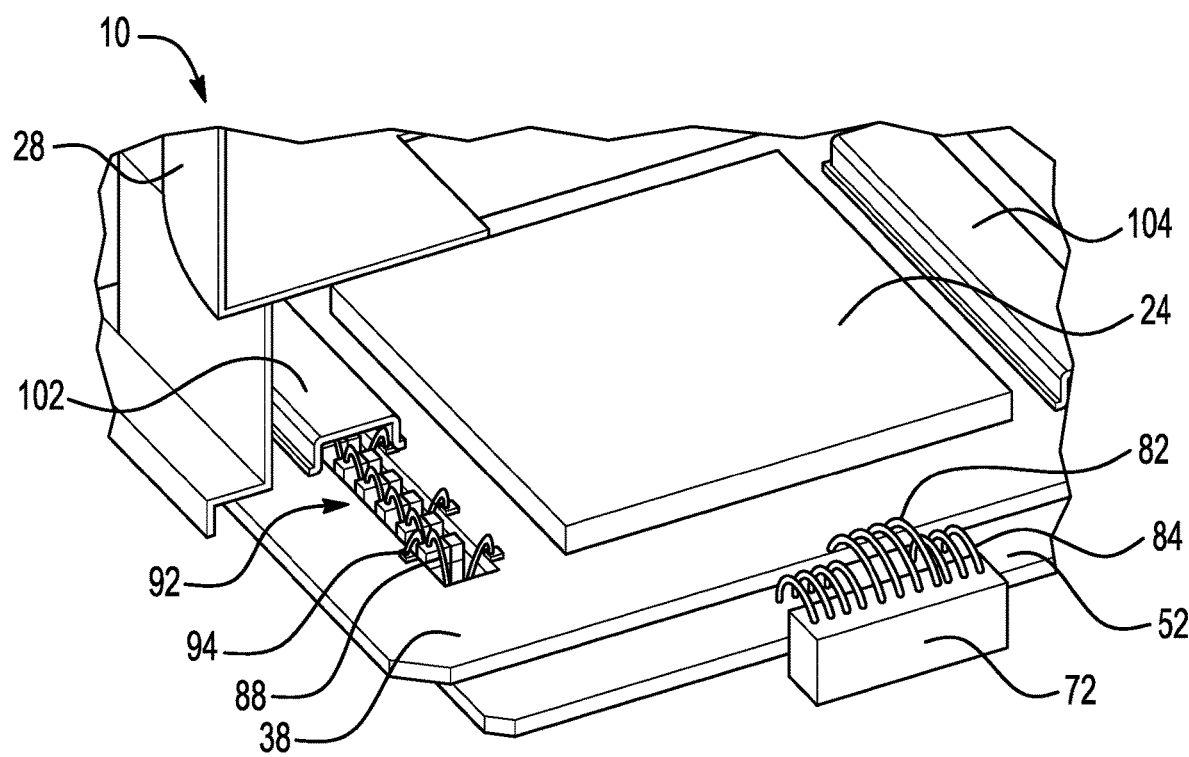
FIG. 3 is another oblique view of the camera assembly of FIG. 1, with the portions of the camera assembly removed for illustration purposes.
Figure 4:
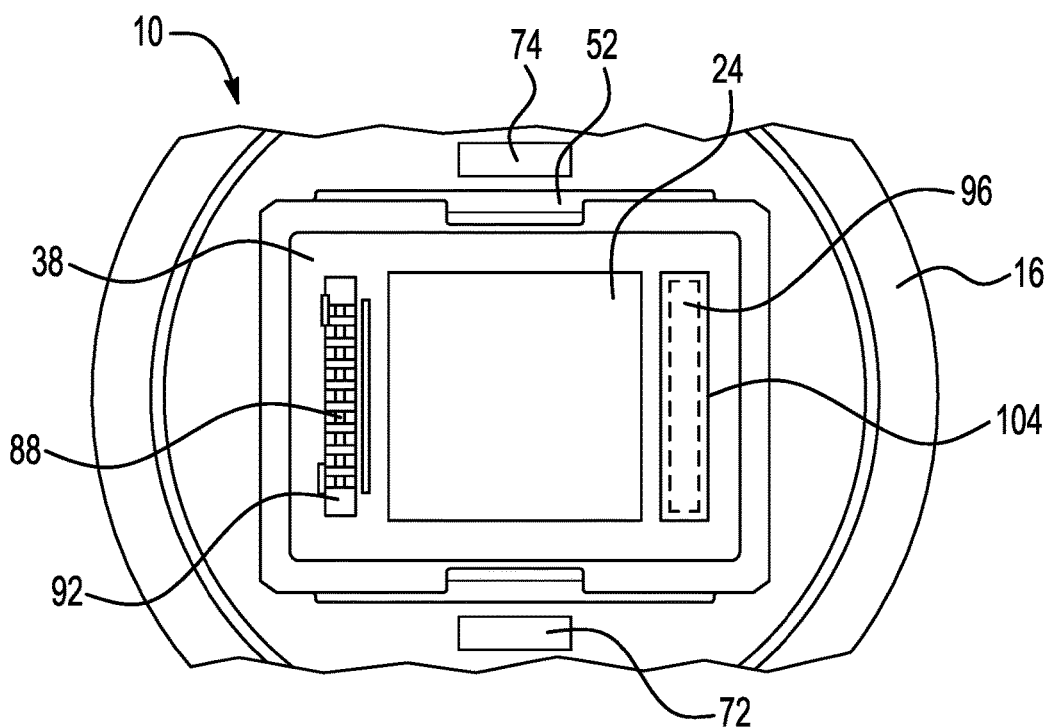
FIG. 4 is a top view of parts of the camera assembly of FIG. 1.

Electrical feedthroughs 72 and 74 are used to make electrical connections to the subplatform 52 and the platform 38, to provide electrical power to and signals to and/or from the platform 38, and from there to and from the ROIC 24 and the detector 22. With reference to FIG. 3, signal connections 82 from the feedthrough 72 are connected directly to the platform 38. Power and ground connections 84 are made from the feedthrough 72 to the subplatform 52.

The power and ground connections 84 connect to other components on the subplatform 52, such as capacitors 88. The capacitors 88 may be coupled or tied together at common nodes to reduce possible heat loads. The capacitors 88 may be wire bonded to the subplatform 52. The capacitors 88 may be coupled to the platform 38 with wire bond connections 90 through cutouts openings in the platform 38, such as a cutout 92. The power and ground connections 94 from the subplatform 52 to the platform 38 may be made through the openings such as the cutout 92. As best shown in the FIG. 2, the capacitors 88 are at non-cryogenic temperature on the subplatform 52, as opposed to being at cryogenic temperature, and being protected from radiative heating by the cold shield 28.

This facilitates thermal isolation of the subplatform 52 (above the cryogenic temperature), from the cryogenic interior volume 20 enclosed by the housing 16, a cover 102 overlies the cutout 92. The cover 102 may be made of a suitable metal, for example a gold-plated metal that reflects radiation. The cover 102 reflects radiation given off by the (relatively) hot components, such as the capacitors 88, to prevent warming of the interior volume 20. The cover 102 may be attached to the platform 38. An addition cover 104 may be on the opposite side of the detector 22 and the IC 24 covering an additional opening or cutout 96 (underneath the cover 104) in the platform 38 through which connections are made between components on the subplatform 52 and the platform 38.

The cutouts 92 and 94 may be rectangular, or may have other suitable shapes. The covers 102 and 104 may have shapes similar to those of the cutouts 92 and 94.

The camera assembly 10 has an arrangement that allows it to achieve cryogenic temperatures at faster speeds (in less time) than in prior arrangements in which the electrical components are all on a single platform at cryogenic temperature. A finite amount of time is needed to cool the cryogenic portion of the camera to its required operating temperature. This time varies along with the thermal mass and the heat load. It is advantageous to reduce the cooling time, making a camera able to operate faster after the commencement of cooling. Such times are in many situations a metric desired by users of such camera assemblies.

The problem of cooling has been complicated by the use of digital ROICs, which require significantly thicker ceramic platforms than were used in prior cameras, and which require much more on-board bypass capacitance. Further complicating the situation, non-cryogenic capacitors lose a significant amount of their capacitance (for example, about two-thirds of their capacitance) when operated at cryogenic temperatures.

The cutouts 92 and 94 may be arranged to make connections to locations on the platform 38 that align with existing platform construction processes. The connections at the cutouts 92 and 94 may align with existing platform metallization and connection processes/locations.

To give a non-limiting example, the operating temperature of the detector 22 may be 65K, and the ambient temperature may be 296K (23° C.). For application of a cooling power of 1250 mW, a baseline Joule mass of 1773 J, with a heat load of 881 mW (32 Au/Ag wire bonds, in feedthrough(s) to the cryogenic platform), which corresponds to a prior art configuration, cooldown time is about 24 minutes. For a configuration such as that of the camera assembly 10 or other embodiments disclosed herein, there may be a Joule mass of 1120 J, with a heat load of 1066 mW (32 Au/Ag wire bonds, in feedthrough(s), and 18 Au wire bonds to ambient-temperature capacitors), cooldown time may be about 20 minutes. Even with this increased heat load (from the wire bonds involved with the capacitors on the subplatform(s)), there is a 15% reduction in cooldown time.

Systems such as the camera assembly 10 may be advantageous in situations where quick reactions are desirable. Examples of such situations are missiles, missile warning systems, and missile defense systems. Other applications are possible.

Figure 5:
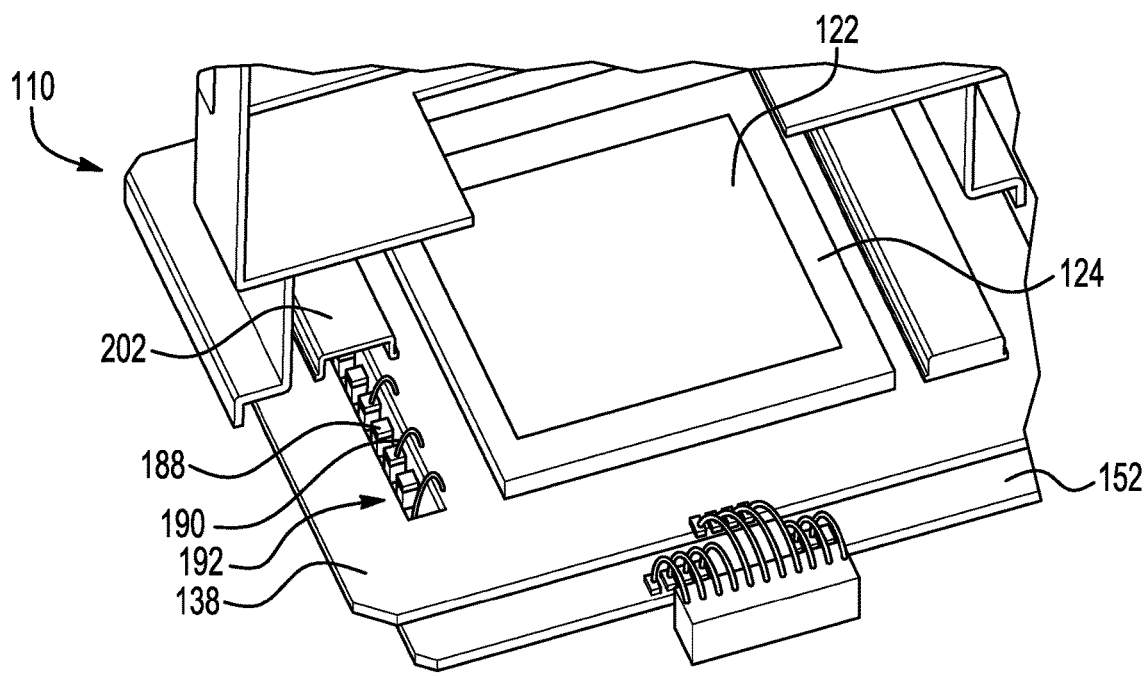
FIG. 5 is an oblique view of parts of a camera assembly according to another disclosed embodiment.

FIG. 5 shows a camera assembly 110, an alternate embodiment that has many features in common with the camera assembly 10 (FIG. 1), with electrical components, such as capacitors 188, on a subplatform 152 that is below a platform 138 that supports a detector 122 and a ROIC 124. The capacitors 188 are connected to the platform 138 through cutouts, such as a cutout 192 that is covered by a cover 202.

The capacitors 188 may be soldered to the subplatform 152 on one end only, and may be oriented such that long axes of the capacitors 188 are normal to an image plane of the detector 122. Connections 190 are made from the capacitors 188 to appropriate traces or metallized connections on the cryogenic platform 138. The connections 190 may be from the unsoldered ends of the capacitors 188 to appropriate locations on the platform 138. This configuration provides physical proximity to the ROIC 124, and reduces the size requirements for the platform 138. This reduces the mass that needs to be cooled to a cryogenic temperature. In addition the use of the soldered connections between the capacitors 188 and the subplatform 152 provides a significant improvement in impedance characteristics, relative to configurations such as in the camera assembly 10 (FIG. 1) described above, where both ends of capacitors are wirebonded.

Figure 6:
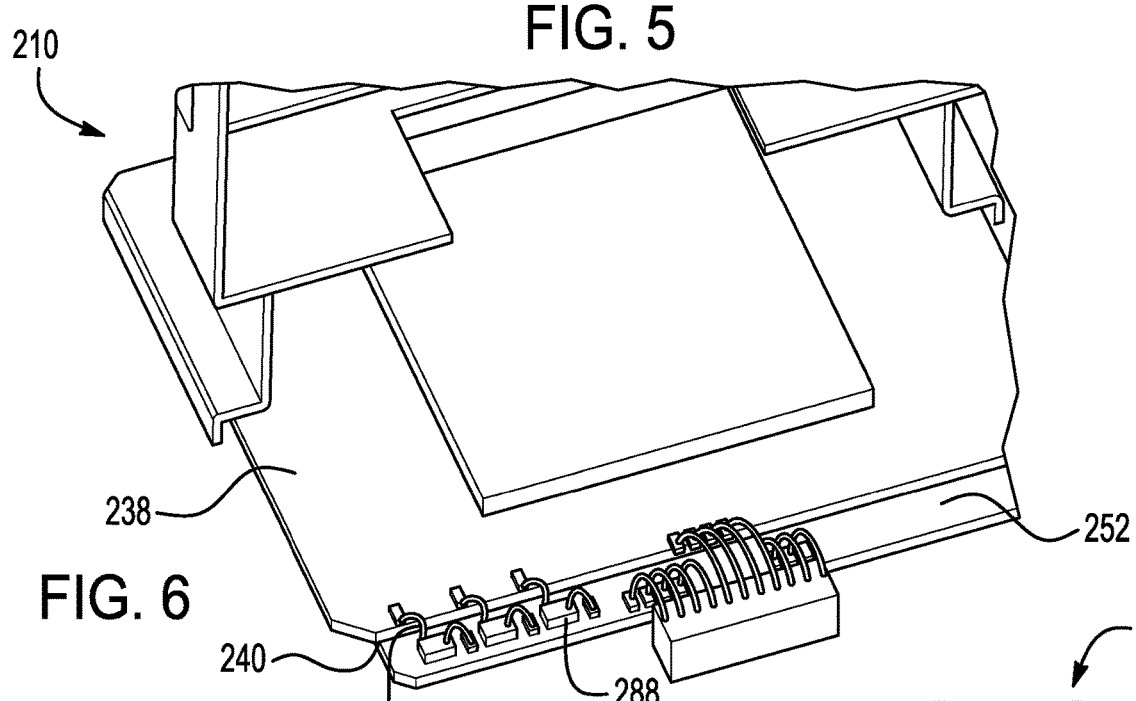
FIG. 6 is an oblique view of parts of a camera assembly according to yet another disclosed embodiment.

FIG. 6 shows another embodiment, a camera assembly 210 where connections 290 between capacitors 288 on a subplatform 252, and suitable traces/layers on a platform 238 (at a cryogenic temperature), are made around an edge 240 of the platform 238, for example by use of wirebonds. This places the capacitors 288 outside of the footprint of a cold shield 228. This removes the need for cutouts and light covers of other embodiments described above, which may reduce the size of the platform 238, as well as removing the need for light covers over cutouts. This may result in a reduction of cooldown time, relative to that for other embodiments described herein.

Figure 7:
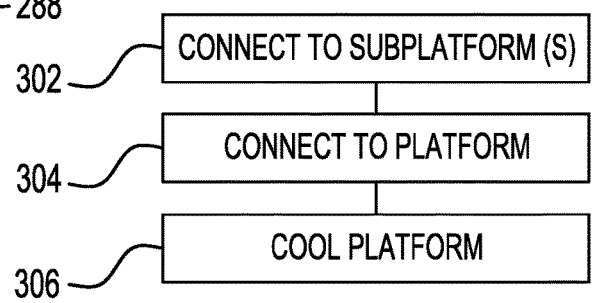
FIG. 7 is a high-level flow chart of a method, according to a disclosed embodiment.

FIG. 7 is a high-level flow chart of a method 300 for operating a camera assembly, such as the various camera assembly embodiments described herein. In step 302 electrical connections are made (or provided) from outside a housing to electrical components (for example capacitors) on an elevated-temperature platform, such one or more subplatforms that are above the cryogenic temperature, such as at (or near) an ambient temperature or other temperature above the cryogenic temperature.

In step 304 connections are made (or provided) between the electrical components on the elevated-temperature platform, and a cryogenic-temperature platform, a platform that mounts an integrated circuit and a detector. The connections may be made through one or more cutouts in the cryogenic-temperature platform (covered by light covers), and/or may be made around edges of the cryogenic-temperature platform.

In step 306 the cryogenic platform is cooled to the cryogenic temperature, while the elevated-temperature platform remains at a temperature above the cryogenic temperature. The cooling may be accomplished using a cold finger in a sealed container, as discussed above.

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A camera assembly comprising:
   a housing;
   a platform inside the housing, wherein the platform is maintained at a cryogenic temperature;
   a detector mounted on the platform and maintained at the cryogenic temperature; and
   one or more subplatforms inside the housing, that provide electrical connections to the platform;
   wherein the one or more subplatforms are at a non-cryogenic temperature.

2. The camera assembly of claim 1, wherein at least some of the electrical connections between the platform and the one of the more subplatforms includes electrical connections that pass through one or more openings in the platform.

3. The camera assembly of claim 2, wherein the one or more openings include one or more rectangular openings.

4. The camera assembly of claim 2, wherein the one or more openings include openings on opposite sides of the detector.

5. The camera assembly of claim 2, further comprising one or more covers that cover respective of the one or more openings.

6. The camera assembly of claim 5, wherein the one or more covers reflect radiation from the one or more openings away from a cryogenic interior volume that is within the housing.

7. The camera assembly of claim 1, wherein at least some of the electrical connections between the platform and the one of the more subplatforms includes electrical connections that pass around one or more outer edges of the platform.

8. The camera assembly of claim 1, wherein the one or more subplatforms are in direct contact with the housing.

9. The camera assembly of claim 1, wherein the one or more subplatforms are maintained at an ambient temperature of an environment outside the housing.

10. The camera assembly of claim 1, wherein electrical components are located on the one or more subplatforms.

11. The camera assembly of claim 10, wherein the electrical components include capacitors.

12. The camera assembly of claim 11, wherein the capacitors are wire bonded to the one or more subplatforms.

13. The camera assembly of claim 11, wherein the capacitors are soldered to the one or more subplatforms.

14. The camera assembly of claim 10, wherein the electrical components are aligned with one or more openings in the platform.

15. The camera assembly of claim 10, wherein the electrical components are outside a footprint of a cold shield that is attached to the platform.

16. The camera assembly of claim 1, wherein the detector is mounted to an integrated circuit, and the integrated circuit is in turn mounted on the platform.

17. The camera assembly of claim 16, wherein the detector is a photovoltaic detector of infrared light.

18. The camera assembly of claim 16, wherein the integrated circuit is a readout integrated circuit (ROIC).

19. The camera assembly of claim 1,
   further comprising a cold finger that is in contact with the platform; and
   wherein the cold finger passes through an opening in a subplatform of the one or more subplatforms.

20. A method of operating a camera assembly, the method comprising:
   providing a detector of the camera assembly, on a platform of the camera assembly, within a housing of the camera assembly;
   providing electrical components of the camera assembly on one or more subplatforms of the camera assembly; and
   cooling the platform to a cryogenic temperature while the one or more subplatforms are at a non-cryogenic temperature.

* * * * *